Oct. 28, 1958 W. J. OYALA 2,858,066
CASH REGISTER WITH ELAPSED TIME METER
Filed Oct. 29, 1956

INVENTOR.
WILLIAM J. OYALA
BY
*Buckhorn, Cheatham & Blore*
ATTORNEYS

United States Patent Office 2,858,066
Patented Oct. 28, 1958

2,858,066

CASH REGISTER WITH ELAPSED TIME METER

William J. Oyala, Portland, Oreg., assignor to Fred Meyer, Inc., Portland, Oreg., a corporation of Oregon Application October 29, 1956, Serial No. 618,912

1 Claim. (Cl. 235—6)

The present invention relates to apparatus for use in retail store merchandising, and more particularly to apparatus for use at check stands.

Merchandising, in certain lines, particularly in groceries, is extremely competitive and the margin of profit is not great. Accordingly, it is important to profitable operation that personnel be as efficient as possible. In many self-service stores, such as grocery stores, a number of cashier stands are used, to which the customer can bring his selected items for packaging and totalling of the cost. Cashier stands are frequently provided with multiple drawer cash registers so that the cashiers can spell one another at the register, each cashier being assigned to a particular drawer. It is ordinarily not feasible to regulate the cashiers' period at the registers since the rate of business varies during the day and cashiers may be assigned to other duties in the store such as piling stock on the shelves when their presence is not necessary at the cashier stand. Accordingly, it has been difficult heretofore for the store management to determine how much time has been spent by one particular cashier at a register, and to determine the individual efficiency of the cashier in checking out articles brought to a particular stand by the customers.

It is an object of the present invention to provide timing apparatus in combination with a cash register for automatically totalling the time each cashier spends at the register so that by determining the number of sales rung up by a cashier, his efficiency may be determined.

It is another object of the invention to provide timing devices in combination with a multi-drawer cash register in an arrangement in which the timing devices are automatically operated by the normal operation of the cash register so as to show the total time spent by the various cashiers at the register over an operating day or week or other selected period.

Other objects and advantages of the invention will become more apparent hereinafter.

Figure 1:
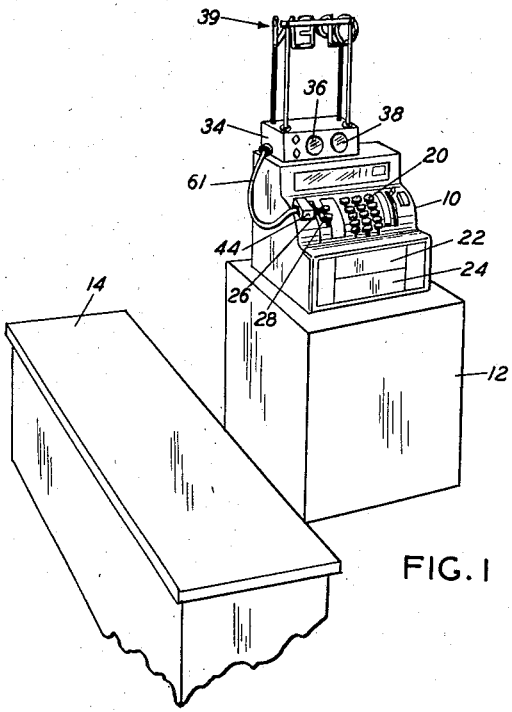
Fig. 1 is a perspective view showing a check stand, a cash register, and time meters arranged in accordance with the invention.

Referring first to Fig. 1, the invention is illustrated in connection with a cashier's stand having a multi-drawer cash register 10 supported on a suitable table 12. Adjacent the table 12 is a counter 14 which is spaced from the table 12 to define an aisle in which customers may place carts of selected merchandise for checking out by a cashier operating a cash register 10.

The cash register 10 may be of conventional type of construction and may include a plurality of keys 20 which are punched by the cashier to indicate the price of the articles being checked out. The register 10 is shown as having two cash drawers 22, 24, and two cashiers' keys or operators' keys 26, 28. Mounted in the register adjacent each of the keys 26, 28 are locks 30, 32. The operator key 26 and lock 30 are arranged to control the opening of the cash drawer 22, while the operator key 28 and lock 32 are arranged to control the opening of the cash drawer 24. When the keys 26, 28 are raised from the surface of the register, or in what may be termed their "off" position, the cash drawers 22, 24 are locked and cannot be opened. The locks 30, 32 are provided to lock and hold the keys in their "off" position. If a cashier desires to operate the register, for example, to use the cash drawer 22, he manipulates the lock 30 to release the operator key 26 and depresses the key 26 to its "on" position. The cash drawer 22 is unlocked upon depression of the key 26 and can be opened to deposit money or make change in the usual manner. When the cashier leaves the cashier's stand, he operates the lock 30 which causes the key to move outward from its "on" to its "off" position, to lock the register so that other unauthorized personnel cannot open his cash drawer. The details of the construction of the register which effect this control over the cash drawer is not shown since suitable construction is well known to those skilled in the art. Examples of cash registers operating in this manner include National Cash Register Model 6094 (92 R and S) and Model 6104 (9) 3. Patents showing multidrawer cash registers with individual operator keys for unlatching the drawers include 1,795,115, 2,309,901 and 2,404,170.

The lock 32 and operator key 28 are similarly operated by a cashier assigned to the drawer 24.

As has been mentioned hereinbefore, it is desirable in self-service grocery stores and the like to assign each cashier a separate cash drawer so that he may accurately account for the money he has handled. However, over a given period such as a working day, the cashiers will spell one another at various times and it is exceedingly difficult to keep any sort of a record of the total time a cashier spends at the register so that the efficiency of the cashier may be computed on the basis of the number of sales the cashier rings up over a given period.

In accordance with the present invention, time devices or meters are provided in combination with the register with a control arrangement such that the meters are automatically operated by the normal operation of the cash register to total the elapsed time a cashier spends at the register. According to the illustrated embodiment, and referring to Fig. 1, there is mounted on top of the register a housing 34 having a pair of conventional, self-starting electric time meters 36, 38 mounted therein. The meters 36, 38 preferably indicate the total elapsed time in minutes during which they are in operation. Mounted on top of the housing 34 is a neon "open" sign 39 for indicating to the customers that a cashier is on duty at that register.

Figure 4:
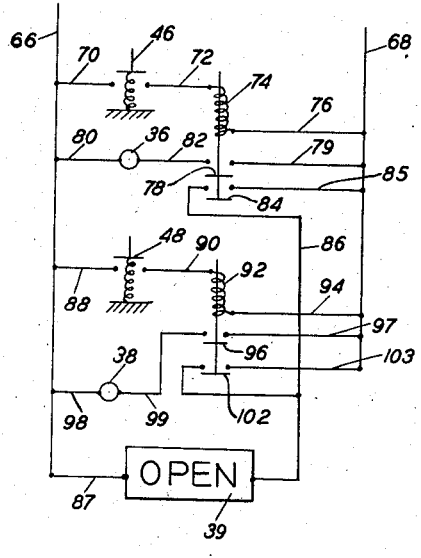
Fig. 4 is a diagrammatic plan view of the circuits used in the present invention.
Figure 2:
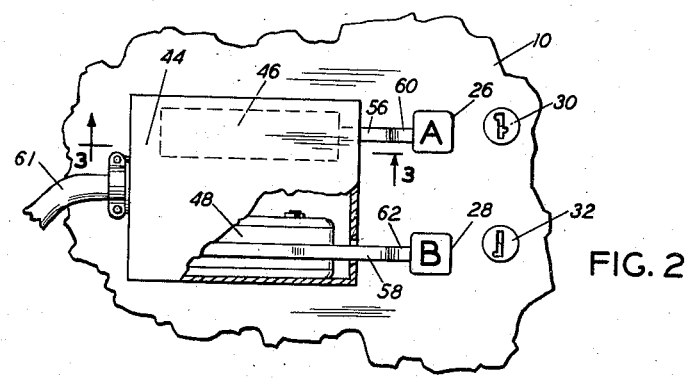
Fig. 2 is an enlarged, fragmentary view of the register showing the switches arranged therewith.
Figure 3:
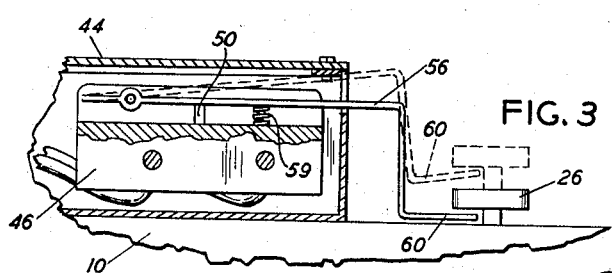
Fig. 3 is a sectional view taken along line 3—3 of Fig. 2.

Switch means are provided for starting the meter 36 upon depression of the operator key 26 when the cashier takes his position at the cash register, and for stopping the meter when the key is raised as the cashier leaves the cash register. Means are also provided for similarly starting the meter 38 when the key 28 is depressed, and for stopping when the key is raised by operation of the lock 32 at the end of a cashier's spell at the register. Referring more particularly to Figs. 2, 3 and 4, such means comprises a switch box 44 secured to the register in a suitable manner adjacent the operating keys 26, 28. Mounted within the housing 44 are a pair of identical switch mechanisms 46, 48. Preferably the switch mechanisms 46, 48 are of the normally open type closed by depressing an outwardly biased actuating plunger 50 inwardly of the switch housing. Suitable switches are sold under the trademark "Micro." Pivotally mounted on the housing of the switch mechanisms 46, 48 are switch operating levers 56, 58, respectively, which extend over the plunger 50 of the corresponding switch for depressing the plunger and closing the switch. A spring 59 is provided between each of the levers 56, 58 and the corresponding housing normally to hold the levers up so that the plungers 50 may extend from the switch housings. The lever 56 is formed with a toe 60 which projects beneath the head of the operating key 26 and the lever 58 is formed with a toe 62 which projects beneath the head of the key 28. Referring to Fig. 3, depression of the respective key 26 or 28 will cause the corresponding operating lever to be moved downwardly to depress the actuating plunger 50 of the respective switch mechanism and close the switch. When the depressed operating key is raised, the spring 59 will raise the corresponding lever whereupon the switch will open immediately. The switches 46, 48 are connected by a suitable circuit so as to operate the time meters 36, 38, respectively, and the sign 39, such a circuit being indicated schematically in Fig. 4. The electrical connection between the switches 46, 48 and the time meters 36, 38 is made through a conductor indicated at 61.

Referring to Fig. 4, supply conductors for the circuit are indicated at 66 and 68, it being understood, of course, that such conductors may lead from any suitable source of electrical energy and may be fused or provided with other protective devices in a conventional manner. One of the contacts of the switch 46 is connected by lead 70 to the supply line 66. The other contact of the switch 46 is connected by lead 72 to the coil of a relay 74 which is in turn connected to the supply line 68 by a lead 76. The relay 74 is provided with a normally open contact 78 one side of which is connected by a lead 79 to the supply line 68. The time meter 36 is connected between the supply line 66 and the other side of the relay 78 by leads 80, 82 whereby actuation of the relay 74 causes the circuit through the meter 36 to close and the meter to start running. A second normally open contact 84 is provided on the relay 74 for closing a circuit through the "open" sign 39, one side of the contact 84 being connected by a lead 85 to the supply line 68, the sign 39 being connected by leads 86, 87 between the other side of the contact 84 and the supply line 66. One contact of the switch 48 is connected by a lead 88 to the supply line 66. The other contact of the switch 48 is connected by a lead 90 to one side of the coil of the relay 92, the opposite side of the coil being connected by a lead 94 to the supply line 68. The relay 92 is provided with a normally open contact 96 one side of which is connected by a lead 97 to the supply line 68. The time meter 38 is connected between the supply line 66 and the other side of the contact 68 by leads 89, 99. The relay 92 is also provided with a normally open contact 102 one side of which is connected by a lead 103 to the supply line 68, the other side being connected to the lead 86 whereby the circuit through the sign 39 will be closed upon closing of either switch 46 or 48.

When the cashier assigned to the cash drawer 22 begins a period of assignment at the register, he manipulates the lock 30 and depresses the operator's key 26. This will effect closing of the switch 46, energizing the relay 74 to raise the contacts 78, 84, closing the circuit to the time meter 36, and effecting the lighting of the "open" sign 39 so that the customers will know that the check stand is open and groceries or articles may be checked out there. When the cashier assigned to the cash drawer 22 departs from the register, such as when he is relieved by another cashier or assumes some other duties in the store, he manipulates the lock 30 to raise the operator's key 26, whereupon the switch 46 will open, de-energizing the relay 74, and whereupon the contacts 78, 84 will drop out, turning off the "open" sign and stopping the time meter 36. Similarly, when the cashier assigned to the cash drawer 24 begins his duty, he will manipulate the lock 32 and depress the operating key 28, closing the switch 48 and thereby energizing the relay 92 to effect closing of the contacts 96, 102. This starts the time meter 38 and turns on the open sign 39. When this cashier leaves the register, he will manipulate the lock 32 to lock his cash drawer, at the same time causing the operator keys 28 to raise and causing the switch 48 to open, stopping the time meter 38, and turning off the open sign 39. Since the time meters 36, 38 start and stop simultaneously with the cashier's assuming and leaving their station at the register, the total elapsed time a cashier spends at the register may be ascertained at the end of the day by observation of the time meters. Thus, the efficiency of the cashiers may be determined by the number of sales they have rung up during their period at the register. If the number of sales rung up by a cashier are not up to a predetermined standard, the cashier can be trained to increase his efficiency in checking out items and ringing up sales or assigned to other duties more commensurate with his demonstrated aptitudes.

While the invention has been shown in connection with a cash register having two cash drawers and a particular arrangement of operators' keys, obviously the invention can be utilized in connection with registers having other numbers of cash drawers and with other arrangements of operators' keys movable from an "off" to an "on" position to permit opening of the particular cash drawer. Thus, although only a particular embodiment of the invention has been illustrated, it is to be understood that the invention is not necessarily so limited and that the various details shown are merely illustrative. I claim as my invention all such modifications as come within the true spirit and scope of the appended claim.

I claim:

In a cashier stand including a cash register having a plurality of cash drawers for use one by each by a number of cashiers for periods of indeterminate length, said register having a plurality of operator keys operable one by each cashier from an "off" to an "on" position during the period the particular cashier is stationed at the register to unlock a particular cash drawer for such cashier, the combination therewith of means for totalling the time each cashier is stationed at said register, said means including a plurality of time meters, one for each of said drawers, a plurality of switches operatively connected one with each of said time meters and operable to start and stop the associated meter, a switch operating member for each of said switches and means operatively connecting said switch operating members one with each of said operator keys to effect operation of the associated switch and starting of the corresponding time meter upon movement of an operator key from the "off" to the "on" position thereof, and stopping of such corresponding time meter when the last mentioned operator key is returned to its "off" position.

References Cited in the file of this patent

UNITED STATES PATENTS 2,299,174    Plummer _____ Oct. 20, 1942